April 21, 1925.

E. L. BURNE 1,534,026

CHARGING SECONDARY BATTERIES

Filed Feb. 10, 1923    2 Sheets-Sheet 1

EDWARD LANCASTER BURNE
INVENTOR;

By
his Attorney.

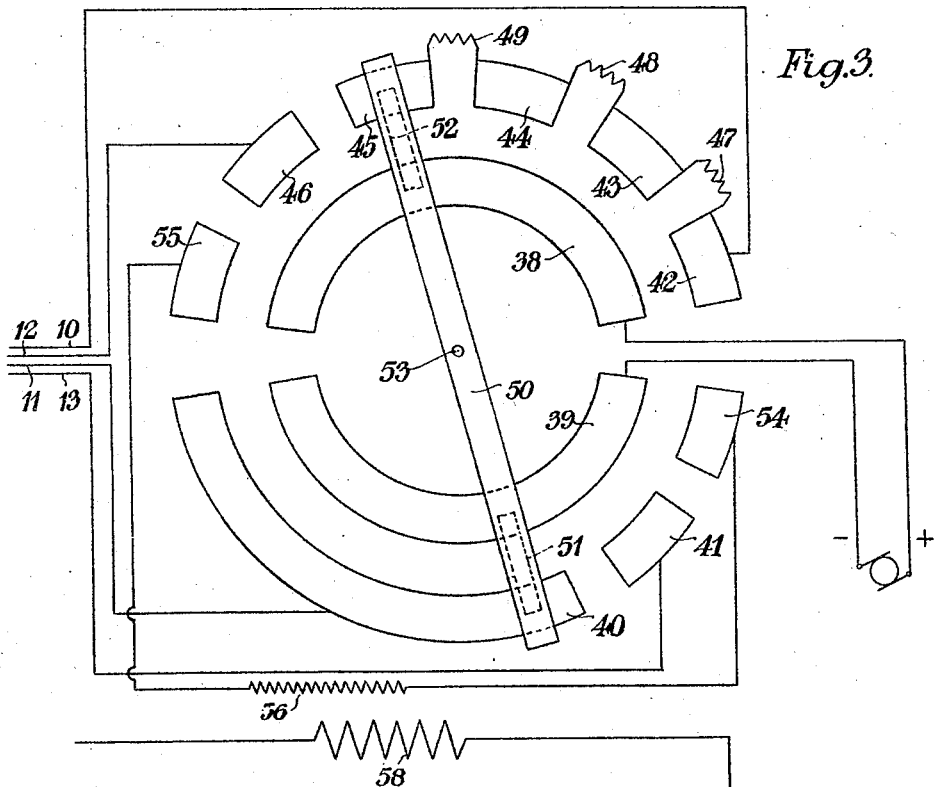
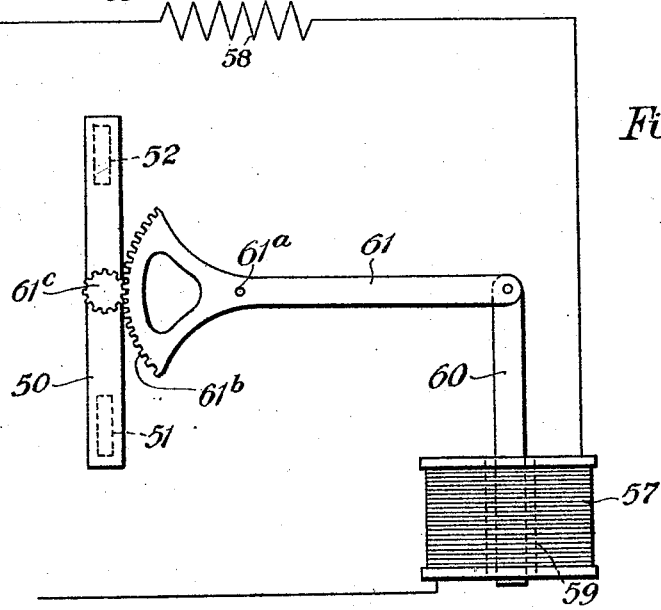

Patented Apr. 21, 1925.

1,534,026

UNITED STATES PATENT OFFICE.

EDWARD LANCASTER BURNE, OF WESTMINSTER, LONDON, ENGLAND.

CHARGING SECONDARY BATTERIES.

Application filed February 10, 1923. Serial No. 618,429.

*To all whom it may concern:*

Be it known that I, EDWARD LANCASTER BURNE, residing at 28 Victoria Street, Westminster, London, S. W. 1, England, a subject of the King of Great Britain and Ireland, have invented certain new and useful Improvements in Charging Secondary Batteries, of which the following is a specification.

This invention refers to a method by which a battery of secondary cells may be efficiently charged by an electric current that is variable in amount and comprises means for automatically or otherwise subgrouping or combining groups to vary the number of cells in the charging circuit as required for the prevailing conditions, and may comprise means for interposing a varying resistance in the charging circuit to allow a more graduated stepping of the E. M. F. of the dynamo circuit, and means for equalizing the charging rate of the groups where the number of cells in the battery is not a multiple of the number of groups.

It is well known that if the charging current is below a certain minimum the desired electro-chemical action, which should take place during charging, is not fully established, with the result that the cells are not properly charged.

It is also known that an excessive charging current damages the cells besides causing a waste of energy.

In cases where the energy available is too small for properly charging a battery in the ordinary way attempts have been made to overcome the difficulty by dividing the cells composing the battery into groups and charging each group successively and in turn. Thus suppose a battery is divided into three groups of cells, the electromotive force needed for each group will be only one-third of that required for the whole battery, with the result that the amperage may be increased three-fold and a given quantity of energy employed to better advantage.

Such an arrangement, however, presupposes that a fairly uniform charging current is obtainable as for the reasons already stated, it is not permissible to charge below a certain minimum or to exceed a certain maximum rate, and the allowable variation from the normal charging current is confined to comparatively narrow limits.

If a prime mover of irregular power, such as a windmill, is employed for dynamo driving the output of the latter is likely to vary to a far greater degree than can be permitted with the charging current of a battery. As a consequence there will be periods when power will have to be wasted— on the one hand because it is insufficient and on the other, because it is in excess.

My invention is designed to remove these disabilities and it consists in varying the number of groups of cells in the charging circuit automatically or otherwise when required by the conditions prevailing. The system of grouping or dividing the cells for charging has the advantage of enabling charging of one group during discharge of the battery as a whole without seriously increasing the total voltage of the discharge circuit, and my invention also has this advantage.

In carrying out this invention I separate the battery into a varying number of groups, the number varying according to the prevailing conditions.

Where in the arrangement into groups, the groups are necessarily unequal, it has been found advisable to arrange for resistance or counter E. M. F. cells to equalize the charging of the groups. Suppose for instance it is desired to charge 28 cells in groups of 3 and 6 the number is made up to say 30 (the nearest multiple of 6) by the addition of two counter E. M. F. cells or an equivalent resistance or resistances, that is to say, the groups in threes may be 10, 10, 8+2, or 1+9, 10, 9+1. These cells or resistances may be used in the discharge circuit if required. The counter E. M. F. cells are substantially unaffected by the charge being generally either unformed grids or plain lead plates immersed in the usual electrolyte and their sole purpose is to form a resistance.

Thus I may charge the smallest group or combine the groups so as even to bring the whole battery into the charging circuit, but in order to equalize the charging I arrange that the groups shall be connected with the dynamo or other source of supply in turn.

When a large (main) group is in circuit the charging voltage is twice that of a sub-group and the speed of the dynamo is increased to give the extra voltage. This has an important advantage as it enables the windmill speed to bear a definite relation to an increased wind speed and the wind-power is therefore much more fully utilized than would be the case with a constant or nearly constant voltage machine; (for example); Suppose that it required a wind of about 20 m. p. h. to charge the main group at maximum rate and that a sub-group could be charged at half rate in a 10 mile wind— the power required would vary about as the windpower (which is of course as the cube of the velocity).

Referring to the drawings filed herewith:

Figure 2:
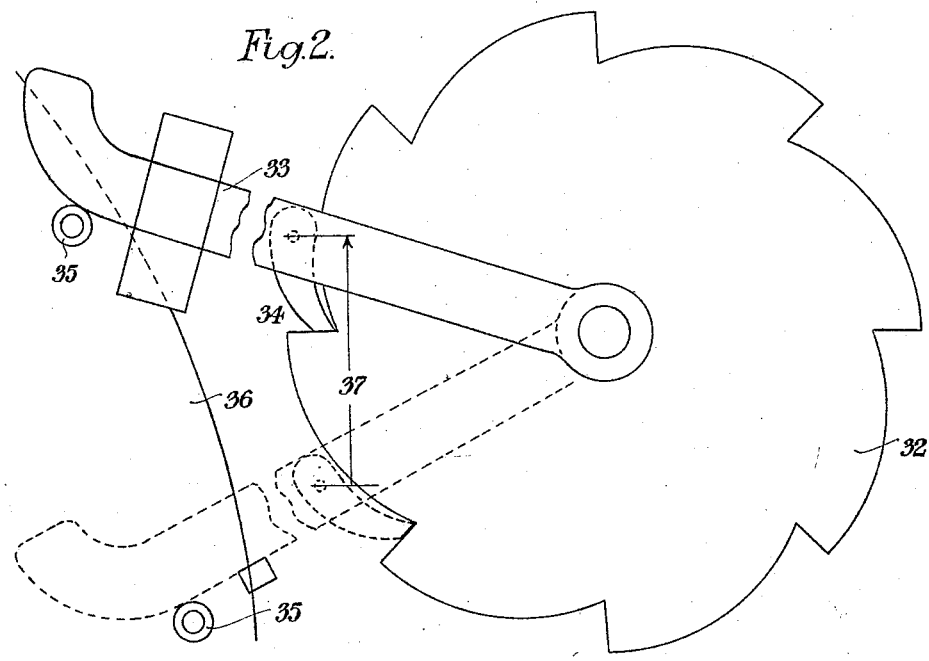
Fig. 2 is one form of operating gear for the apparatus.

Figs. 3 and 4 shew arrangements for automatically altering the grouping of the cells according to the strength of the charging current;

The storage battery may be divided into any number of groups and sub-groups as may be required, but to simplify the description two main groups and four sub-groups are shewn herewith. The two main groups are represented by 2, 3 and 4, 5, and the four sub-groups by 2, 3, 4 and 5.

6, 7, and 8, 9, indicate two distinct and separate pairs of mains from the dynamo or other source of supply. The mains 6, 7, are connected to segments 10, 11 of a switch and the mains 8, 9, to other segments 12, 13. Four pairs of diametrically opposed segments, 14, 15, 16, 17, 18, 19, and 20, 21, are disposed concentrically around the segments 10, 11 and two pairs of diametrically opposed segments 22, 23 and 24, 25, are disposed concentrically around the segments 12, 13. Upon a common centre 26 is mounted a bar 27 of insulating material.

The outermost segments 14, 16, 18 and 20 are adapted to be connected to the segment 10 and the outermost segments 15, 17, 19 and 21 to the segment 11 by contact pieces 28, 29, carried on the bar 27, opposite outer segments being simultaneously connected to their respective segments 10 or 11.

In a similar manner the inner segments 22, 23, and 24, 25 are adapted to be connected to the inmost segments 12, 13, by the contact pieces 30, 31.

The bar 27 is adapted to be rotated intermittently or otherwise at any desired speed by any suitable external source of power, but I prefer to employ motion derived from the dynamo shaft or from the prime mover.

In operation supposing the bar 27 to be in the position shewn in the drawings and current flowing through the mains 6, 7, but not through the mains, 8, 9, the dynamo will obviously be charging sub-group 2.

If, however, the current is transferred from the mains 6, 7, to the mains 8, 9, both 2 and 3 sub-groups will be in circuit. If the bar 27 is rotated so as to make segment 16 contact with segment 10 and segment 17 with segment 11, either the sub-group 3, will receive the charging current or the combined groups 2 and 3 according to which pair of mains are connected to the dynamo at the time being.

As the positive pole of sub-group 2 and combined group 2 and 3 are identical the segment 14 may be connected to segment 22 and one conductor only need to be taken to the terminal. For the same reason negative segment 17 and segment 23 may also be connected and one conductor only taken to the negative terminal of the 2 and 3 group. Similarly segment 18 may be joined to segment 24 and segment 21 to segment 25.

Further; as the negative of sub-group 2 is joined to the positive of group 3 the conductor to this point may be used alternatively as negative and positive and a second conductor avoided by cross connecting segments 16 and 15. The same applies to segments 18 and 17 and to 20 and 19. In this way the wiring to the various groups composing the battery may be greatly simplified.

Any number of groups or sub-groups may be formed out of the storage battery according to the available electrical energy and the number of cells in the battery.

To ensure an even state of charge of the battery as a whole I prefer to connect each group or sub-group of cells with the dynamo in succession, but for a limited time only, but I may rotate the bar 27 with its contacting pieces continuously; either method tending to evenly distribute the charging current over the whole battery.

I may make the electrical connections from the dynamo to the cell groups by any suitable automatic mechanism, such as clockwork, but I prefer to operate the switches for the purpose by motion derived from the prime mover or from the dynamo spindle, suitable speed reducing and transmitting gear being interposed between the switches and the prime mover or dynamo spindle, if and when required in order that the dynamo may be switched on to the groups of cells in turn and at the desired interval of time.

Figure 1:
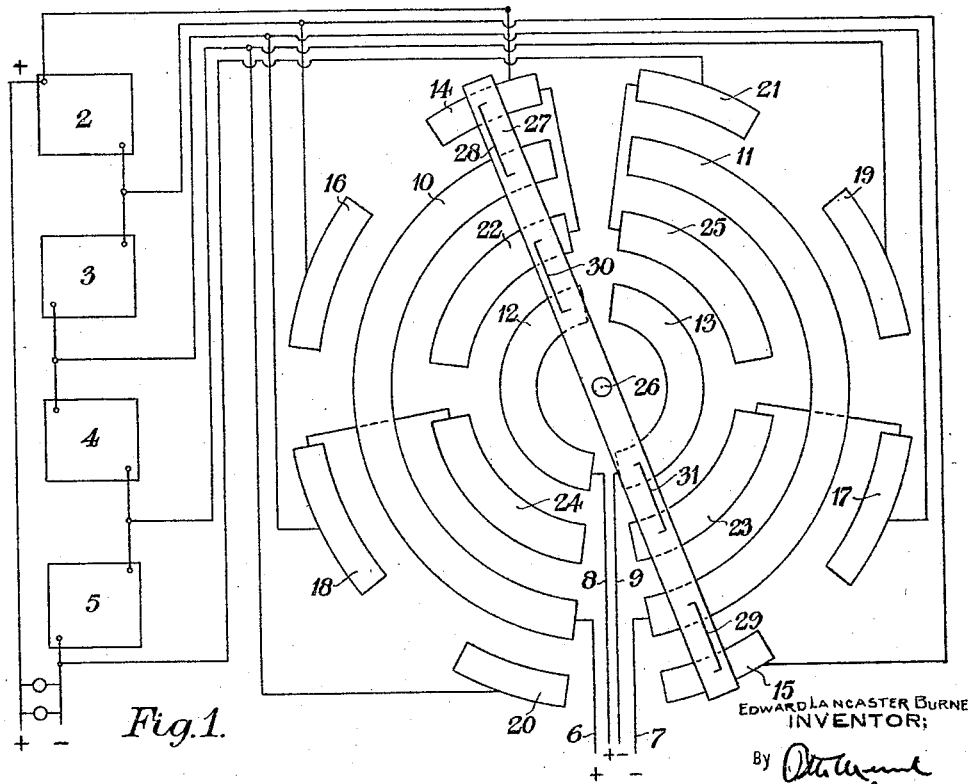
Fig. 1 is a diagrammatic sketch shewing one method of charging a storage battery according to this invention.

This may be effected by a ratchet wheel operated as shewn in Fig. 2 in which:

A ratchet wheel 32 with teeth in number corresponding with the numbers of contacts 14 and 15, 16 and 17, 18 and 19, 20 and 21, that is eight in the case shewn, is secured to the spindle carrying the insulating bar 27 (Fig. 1). A weighted or spring controlled lever 33 carrying a pawl 34 is free to oscillate on this spindle. One end of this lever is raised at intervals by means of the roller 35 on a wheel 36 which is rotated at the desired speed by any suitable external source of power, but I prefer to employ means driven off the dynamo shaft or off the prime mover for causing rotation.

The raising of the end of this lever 33 allows the pawl 34 to engage with a tooth of the ratchet wheel.

Further rotation of the wheel 36 allows the lever to fall suddenly (the distance 37 being so proportioned that the ratchet wheel may be moved through one eighth of a revolution) and to shift the contact pieces 28 and 29 to a fresh pair of the outer segments. Simultaneously the contact pieces 30 and 31 will move on the inner segments 22 and 23, but the relative movement of the contact pieces and the size of the segments are so proportioned that the contact pieces 30 and 31 will engage with either of the two pairs of inner segments 22 and 23, or 24 and 25 during two movements of the ratchet wheel. In this manner a sub-group of cells may be put into circuit by connecting the segments 10 and 11 with the dynamo or source of supply and disconnecting the segments 12 and 13. If this order is reversed two sub-groups are combined to form one main group in the charging circuit.

Instead of operating the switch by mechanical power I may employ electrically operated solenoid or relay switches, the current for actuating them being derived from the dynamo, or if desired from the cells and the electrical connection to the solenoid or relay switches being established by an electrical contacting device operated by mechanical power in the manner previously described, or by a difference of potential existing between any group of cells and the rest.

I may connect the groups or the sub-groups with the charging circuit as required in any suitable manner, for example, by means of a change over switch, hand operated or otherwise, and so arranged that either the outer segments 10 and 11 may be connected with the dynamo and the sub-groups of cells 2, 3, 4 and 5 charged in succession or the inner segments 12 and 13 connected and the main groups 2, 3 and 4, 5, charged in succession.

I prefer, however, to effect the change over by automatic means, and Fig. 3 shows one method by which this may be accomplished.

In the Fig. 3, 38 and 39 represent two conducting segments which are connected to the dynamo or other source of electrical energy and 40 a concentric segment which is connected to segment 11 in Fig. 1. 41 is a supplementary segment which is connected to segment 13 in Fig. 1, 42 to 46 are concentric segments the first four of which (42, 43, 44 and 45) are connected through the medium of the resistances 47 to 49 to segment 10 in Fig. 1 and the last of which (46) is connected to segment 12 in Fig. 1. These resistances may be dispensed with if desired. 50 is an insulated bar carrying contacts 51 and 52 and revoluble about the centre 53. 47, 48 and 49 are suitable resistances which I may employ, connecting segments 42 to 43, 43 to 44, and 44 to 45. The segments and the resistances may vary in number and degree according to the number of cells composing each sub-group in the battery.

If the insulated bar 50 is in such a position that the contact 51 bridges segments 39 and 40 and the contact 52 bridges segments 38 and 42 connection will be made between the dynamo and segments 11 and 10 and one of the sub-groups of cells (2, 3, 4 or 5) in the battery will be in the charging circuit. If, however, the bar 50 is rotated so that segments 39 and 41 and segments 38 and 46 are bridged, connection will be made between the dynamo and segments 13 and 12, in Fig. 1 and segments 11 and 10 will be disconnected.

The contact 52 is sufficiently wide to bridge the space between the adjacent segments 42, and 43, 44, 45 and 46. If the contact is moved from 42 to 43 the current will be still conveyed to segments 10 and 11 but the resistance 47 will be placed in the circuit. If the contact 52 is further moved from 43 to 44 the further resistance 48 will be placed in circuit and so on so that when contact 52 reaches segment 45 the whole of the resistances 47, to 49, will be in series with the circuit. Further movement of the bar places contact 51 on segment 41 and contact 52 on segment 46, cutting out all the resistances 47 to 49 and directly connecting the dynamo to segments 12 and 13 thereby changing the charging circuit from a sub-group to a main group.

In this way the higher resistance pertaining to a main group may be introduced in a gradual manner and conversely to a sub-group the resistances may be gradually eliminated.

In order to disconnect the charging circuit should the current become excessive or on account of the battery being fully charged I may employ further segments 54 and 55. These segments are connected to an independent circuit which may consist of a suitable resistance 56, or they may be connected to a suitable electrical device designed to release apparatus which may be employed to stop or to regulate the prime mover.

When the bar 50 is in such a position that the contact 51 bridges segments 39 and 54, and the contact 52 bridges segments 38 and 55, current will no longer flow to the battery but instead it will be diverted to the independent circuit.

The changing device shewn in Fig. 3 may be operated by hand, but automatic means for accomplishing this are indicated in Fig. 4. 57 is a solenoid in the dynamo circuit preferably arranged as a shunt with a suitable resistance 58 which may be adjustable.

Any excess of current will cause movement of the plunger 59 the connecting link 60 and the lever 61 the latter being pivoted at 61ª and having a toothed segment 61 meshing with the pinion 61ᶜ carried by the bar 50. The bar 50 (Fig. 3) with its contacts 51 and 52 is thereby moved through an arc of a circle. The amount of energy required to raise the plunger 59 may be determined by the resistance of a spring or a weight and the rate of movement by a dash pot or other suitable device. Obviously a relay might be employed for putting the solenoid into circuit when the conditions are such that a change in the size of the groups being charged is required, and obviously a straight line movement of the bar 50 might be substituted for a circular movement and the segments arranged accordingly.

While I have shown and described in considerable detail one specific embodiment of my invention, it is to be understood that this showing and description is illustrative only, and for the purpose of making clear the nature of the invention, and that I do not regard the invention as limited to such details, nor to any of them, except in so far as such limitations are included within the terms of the following claims, in which it is my intention to claim all novelty inherent in my invention as broadly as is permissible, in view of the prior art.

What I claim and desire to secure by Letters Patent is:—

1. In apparatus for charging secondary cells in which a dynamo electric machine is employed, cells arranged in groups, means for combining or for separating the groups in relation to the power developed and means for charging each of the said groups in succession, the duration of said charge being determined by the number of revolutions of the dynamo electric machine.

2. In apparatus for charging secondary cells in which a dynamo electric machine is employed, cells arranged in groups, means for combining or for separating the groups in relation to the power developed and means for charging each of the said groups in succession, the said means for charging each of the groups in succession comprising a plurality of contacts, a switch bar operating in conjunction therewith and means for rotating said switch bar by the prime mover.

3. In apparatus for charging secondary cells in which a dynamo electric machine is employed, cells arranged in groups, means for combining or for separating the groups in relation to the power developed and means for charging each of the said groups in succession, the duration of said charge being determined by the number of revolutions of the dynamo electric machine, the number of cells in each group, before combination, being equal.

4. In apparatus for charging secondary cells in which a dynamo electric machine is employed, cells arranged in groups, means for combining or for separating the groups in relation to the power developed and means for charging each of the said groups in succession, the duration of said charge being determined by the number of revolutions of the dynamo electric machine, the said means for combining or separating the groups in relation to the power developed being determined by the speed of the dynamo electric machine.

5. In apparatus for charging secondary cells in which a dynamo electric machine is employed, cells arranged in groups, means for combining or for separating the groups in relation to the power developed and means for charging each of the said groups in succession, the duration of said charge being determined by the number of revolutions of the dynamo electric machine, the said means for charging each of the groups in succession comprising a plurality of contacts, a switch bar operating in conjunction therewith and means for rotating said switch bar by the prime mover.

6. In apparatus for charging secondary cells in which a dynamo electric machine is employed, cells arranged in groups, means for combining or for separating the groups in relation to the power developed and means for charging each of the said groups in succession, the duration of said charge being determined by the number of revolutions of the dynamo electric machine, said means for combining and separating the groups comprising a change over switch.

7. In apparatus for charging secondary cells in which a dynamo electric machine is employed, cells arranged in groups, means for combining or for separating the groups in relation to the power developed and means for charging each of the said groups in succession, the duration of said charge being determined by the number of revolutions of the dynamo electric machine, the number of cells in each group, before combination, being equal, said means for combining and separating the groups comprising a change over switch.

In testimony whereof I affix my signature.

EDWARD LANCASTER BURNE.